Figure 1:
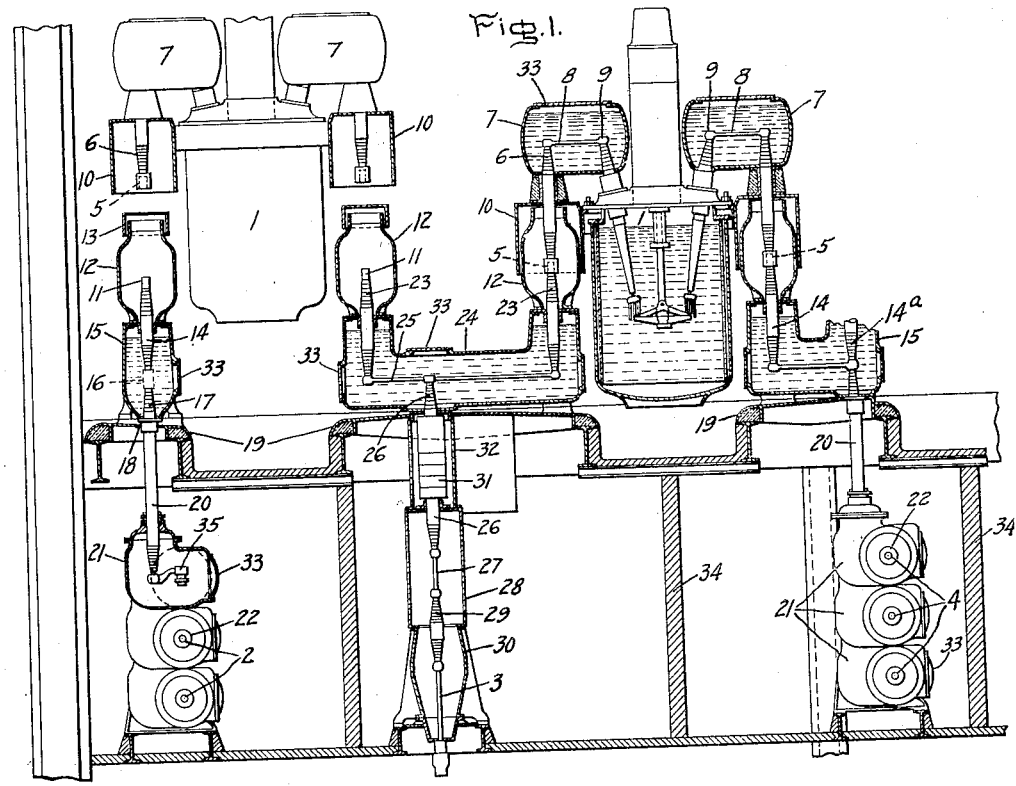

Oct. 25, 1932.  D. R. DAVIES  1,883,881
ELECTRICAL BUS AND SWITCH STATION
Filed Dec. 10, 1930

Inventor:
David R. Davies,
by Charles Mullan
His Attorney.

Patented Oct. 25, 1932

1,883,881

UNITED STATES PATENT OFFICE

DAVID REGINALD DAVIES, OF DIDSBURY, ENGLAND, ASSIGNOR TO GENERAL ELECTRIC COMPANY, A CORPORATION OF NEW YORK

ELECTRICAL BUS AND SWITCH STATION

Application filed December 10, 1930, Serial No. 501,339, and in Great Britain December 20, 1929.

This invention relates to electrical switchgear of what is commonly known as the metal-clad type and has for its object the provision of an improved metal-clad bus and switch station wherein a plurality of sets of busbars, referred to herein as main and auxiliary busbars, are arranged to be connected to feeders through circuit breakers and isolating switches, disconnection between the respective circuit breakers and the two sets of busbars being effected when required by raising the circuit breakers vertically and thereby opening the isolating switches.

The invention has particular reference to the layout or general arrangement of such switchgear, and according thereto the two sets of busbars which are located in two parallel banks at such a distance apart as will permit of the circuit breakers and feeders being located between said busbars are arranged substantially immediately below the isolating switches by which they are connected to their respective breakers and are separated from the breakers by a solid floor or barrier. The floor supports the fixed portions of the isolating switches which are enclosed with their connecting conductors in metal casings. From the isolating switches conductors extend downwards through apertures in the floor or barrier to the busbars below. These conductors may advantageously be insulated with condenser insulation which extends through suitable bushings into the chambers containing the fixed portions of the isolating switches and into the busbar casings respectively. The feeders which are led in substantially midway between the two banks of busbars extend upwards to heads or casings formed in one with the casings containing the fixed contacts of the isolating switches connecting the feeders to the terminals of the circuit breakers. The feeder chamber may be separated by longitudinal walls from the busbar chamber if desired. In some cases the positions of the busbars and feeders may be interchanged. The two banks of busbars will then be placed back to back, but in any case are preferably separated by a wall.

The busbars which extend along the length of the gear may have insulation of the condenser type surrounded with an external metal sheath which is grounded. At the point where the busbars are connected to their respective isolating switches, oil filled junction or T-boxes may be provided into which the condenser insulation surrounding the intermediate portions of the busbars is passed through suitable bushings and preferably in stuffing boxes to permit expansion and contraction with changes in temperature.

This invention will be more fully set forth in the following description referring to the accompanying drawing, and the features of novelty which characterize this invention will be pointed out with particularity in the claims annexed to and forming a part of this specification.

Figure 2:
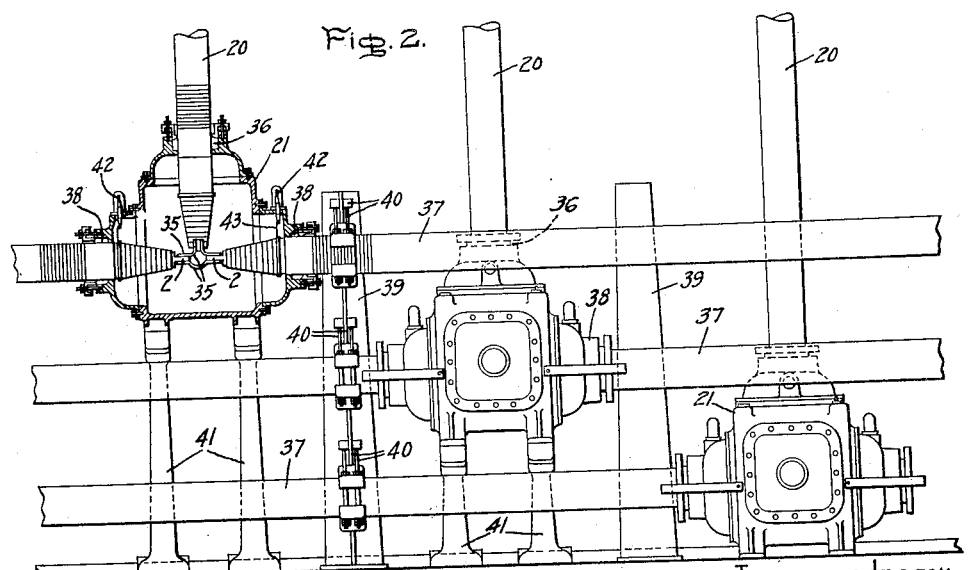

In the accompanying drawing, Fig. 1 is a sectional end elevation of a switchgear unit in accordance with this invention, and Fig. 2 is a front elevation on a larger scale of the busbars shown in Fig. 1.

In Fig. 1 there are illustrated the oil circuit breakers 1, one of which is shown in the elevated or disconnected position wherein it is electrically isolated from the main busbars 2 and the cable or feeder 3. The other circuit breaker is shown in the service or operating position wherein it connects the cable or feeder 3 with the auxiliary busbars 4. The circuit breakers each may be isolated with respect to the electrical circuits associated therewith by means of plug and socket contacts including the socket contacts 5 which are connected through conductors mounted in insulation 6 of the condenser type and extend through suitable bushings into the oil filled chambers 7. The conductors are connected therein through the conducting links 8 with the corresponding terminals 9 of a circuit breaker, the terminals 9 likewise extending into the oil filled chamber 7. The oil circuit breaker may be of any suitable type, and in the present instance is shown as the conventional two-break switch wherein a bridging member is operated to cause separation of the switch contacts within a tank of oil.

Referring more particularly to the isolating means, the socket contacts 5, surrounded by the hoods or cowls 10, are arranged so as to engage and contact with the coacting plug contacts 11 located in the chambers 12 when the corresponding circuit breaker is in its lowered or operating position as illustrated in Fig. 1. The chambers 12 are adapted to be oil filled.

When an oil circuit breaker is elevated to its isolating position as illustrated, the chambers 12 are provided with lids or cover members 13 which are removed when the circuit breaker is lowered to the service position. One set of the plug contacts 11, the present arrangement being a three phase system, is connected with corresponding conductors mounted in and passing through the condenser type insulation 14 and bushings into the oil filled chambers 15. The conductors are connected therein by the removable conducting links 16 to conductors which are provided with the condenser type of insulation 17 and extend vertically downwards through an aperture 18 in the floor or barrier 19. The floor or barrier 19 is constructed so as to support the fixed portions of the switchgear mounted above the same.

The phase conductors previously referred to as having the condenser type of insulation are individually enclosed in grounded metal tubes or sheathing 20 which extend into the corresponding metallic junctions or T-boxes 21 containing the connections between the said phase conductors and the corresponding phase busbars 2 and 4 as hereinafter described. The junctions 21 are adapted to be oil filled. The phase busbars 2 and 4 are likewise individually provided with the condenser type of insulation and extend through the grounded metal tubes 22 to other switchgear units located adjacent the present unit on either side thereof.

The set of isolating plug contacts 11 associated with the feeder 3 is connected to conductors extending through the insulating bushings 23 from the chambers 12 into an oil filled chamber 24, each conductor being connected therein to a tie conductor 25 which is connected to a conductor provided with insulation 26 of the condenser type extending downwardly through the floor 19. The conductor is connected beneath the floor 19 by a removable conducting link 27 within the chamber 28 to a conductor passing through the condenser type bushing 29 to the cable ends 3 and mounted within the compartment 30.

For the purpose of simplicity the various instruments and protective transformers associated in a well known manner with the electrical circuits are indicated diagrammatically at 31 within a casing 32 which, together with the chamber 28 and compartment 30, may be oil filled.

The various oil filled and other casings are preferably provided with removable cover plates 33 for permitting access and inspection to the conductor connections in the usual manner.

For the purpose of providing separate compartments for the main busses, the auxiliary busses and feeders, the same are separated by the vertical walls 34 which are constructed beneath the floor 19 in any suitable manner and extend longitudinally to form individual spaces as indicated. The auxiliary busbars 4 may be connected, as by conductors mounted within the condenser type bushings 14a, with another switchgear unit (not shown) similar to that shown in Fig. 1 and located adjacent and along side the same.

It shall be understood that the operating mechanism for effecting raising and lowering movement of the oil circuit breakers to the isolating and operating positions thereof respectively may comprise any suitable means, as for example an overhead traveling crane (not shown).

Referring more particularly to Fig. 2 which illustrates in greater detail the switch-gear and connections beneath the floor 19, the conductors extending downwardly through the floor in the condenser type insulation and through the grounded tubes 20 are connected with either the main or auxiliary busbars by means of the flexible conductors 35 within the junction boxes 21. The conductor enclosing tubes 20 extend into the junction boxes 21 through the stuffing boxes or glands 36. The main busbars 2 which are insulated with the condenser type insulation previously referred to are individually enclosed in the grounded metal tubes or sheathing 37 which likewise extend into the junction boxes 21 through the stuffing boxes or glands 38 so as to make a fluid-tight joint. The busbar enclosing tubes 37 may be supported in a vertical bank from a plurality of standards 39, two of which are shown by way of example, provided with supporting means comprising adjustable slings 40 illustrated in connection with one of the standards 39. The slings 40 are adjustable to prevent sagging of the tubes 37 at the corresponding supports and for equalizing the supporting forces. The oil filled junction boxes 21 for the phase connections of the two upper busbars are supported upon the standards 41 of appropriate length, whereas the lowermost junction box may rest directly upon the floor or other suitable support.

For the purpose of testing the bushings while the switchgear is in service, there are provided testing terminals 42 connected by the conductors 43 with an outer conducting layer of the condenser type insulation. Similar testing terminals (not shown) may be provided for the vertical conductors located within the grounded metal tubes 20.

The position of the busbars 2, 4 and the cables or feeders 3 may be interchanged, that is the two banks of busbars may be placed back to back, preferably being separated in any event by a wall such as 34.

It shall be understood that this invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. A bus and switch station of the metal clad type comprising a substantially horizontal floor structure, oil circuit breakers mounted above said floor, disconnecting switches for said oil circuit breakers including stationary contacts mounted on said floor structure, busbar and feeder cables in metallic enclosing casings mounted substantially vertically beneath said oil circuit breakers and spaced therefrom by said floor structure, and conductors extending from the stationary contacts of said disconnecting switches through said floor structure to connect with the corresponding phase busbars and feeders.

2. A bus and switch station of the metal clad type comprising a supporting floor structure, oil circuit breakers mounted above said floor structure, stationary disconnecting switch contacts mounted on and adjacent said floor structure for coacting with isolating switch contacts carried by said oil circuit breakers, bodily vertical movement of said circuit breakers being effective to connect and disconnect said circuit breakers, busbars and feeder cables individually mounted within metallic enclosures substantially vertically beneath said circuit breakers and separated therefrom by said floor structure, and metal encased conductors extending from the fixed isolating switch contacts vertically downwardly through said floor structure to connect with the corresponding phase busbars and feeder cables.

3. A bus and switch station of the metal clad type comprising a supporting floor structure, oil circuit breakers mounted above said floor structure, disconnecting contacts for isolating said circuit breakers upon vertical upward movement of said breakers, the movable disconnecting contacts being mounted for bodily movement with said circuit breakers and the stationary disconnecting contacts being mounted on said floor structure, busbars and feeder cables individually mounted within sealing chambers disposed beneath said floor structure, vertical wall structure separating each set of busbars and feeders to form separate compartments therefor, and conductors extending from said stationary disconnecting contacts downwards through said floor structure to connect with the corresponding busbar and feeder phases.

4. A bus and switch station of the metal clad type for connecting a feeder to either a main or auxiliary bus comprising an elevated supporting floor structure, oil circuit breakers mounted above said floor structure, disconnecting switches for isolating said circuit breakers, main and auxiliary busbars mounted beneath said floor structures, a feeder cable extending through said floor structure, each phase busbar provided with insulation and an enclosing grounded metal tube, means supporting said main and auxiliary buses in separate vertical banks beneath the respective circuit breakers, and conductors extending from said disconnecting switches downwards through said floor structure to connect with the corresponding busbar phases, said conductors likewise being enclosed in grounded metallic tubes.

5. A metal clad bus and switch station for connecting a feeder to either a main or auxiliary bus comprising elevated supporting structure, circuit breakers mounted on and above said structure, main and auxiliary busbars mounted beneath said structure, means supporting said main and auxiliary busbars in separate vertical banks extending horizontally in parallel relation, a feeder cable extending from said circuit breakers through said structure and intermediate said banks of busbars, and conductors extending through said structure from said circuit breakers to the respective busbar connections, said conductors and busbars being enclosed by grounded metallic sheathing.

In witness whereof, I have hereunto set my hand this 24th day of November 1930.

DAVID REGINALD DAVIES.